SYNCHRONIZATION OF CODE SYSTEMS

Filed April 12, 1963

INVENTOR
J. W. PAN
BY G. E. Kersey
ATTORNEY 3,436,480
SYNCHRONIZATION OF CODE SYSTEMS John W. Pan, Plainfield, N.J., assignor to Bell Telephone Laboratories, Incorporated, New York, N.Y., a corporation of New York Filed Apr. 12, 1963, Ser. No. 272,588
Int. Cl. G08b *29/00;* H04l *7/00*
U.S. Cl. 178—69.5 7 Claims

ABSTRACT OF THE DISCLOSURE

Apparatus for synchronizing or "framing" incoming code groups is provided in which the rate of occurrence of signals in certain selected digit positions of each code group is monitored. The selected positions are associated with predetermined probabilities of signal occurrence and deviation from the anticipated probabilites results in a regrouping of the code groups so that synchronization is effected.

This invention relates to synchronization, particularly of reflected binary code systems.

Code systems are employed in the processing and in the transmission of information. The information is identified with code words which are, in turn, represented by groups of code signals. If the code signals become misgrouped, as when a system operates out of synchronism, the information recovered from the resulting code words will be in error.

When a code system is synchronized, its code signals are said to be "in frame." The latter term was originally applied to describe the video practice of grouping signals to form a stationary pattern within the "frame" of a picture screen, but it is applicable generally to the proper grouping of code signals.

Conventional synchronization relies upon supplementary signals of special character. The framing of a video wave form, for example, is carried out in response to a train of pulse signals. Such supplementary signals reduce the capacity of a transmission channel.

Accordingly, it is an object of the invention to accomplish the synchronization of code signals without reducing channel capacity. A concurrent object is to eliminate the need for supplementary framing signals.

The most widely employed code signals individually admit of one of two possible values, and are thus said to be binary. In the natural binary code, the oldest and best known, the elements, e.g., digits, of each code word correspond to integers which are proportional to successive powers of two. This code is open to the objection that any minor coding error can result in a major error in a decoded message. To cure the objection, the natural binary code is "reflected" in the fashion described by Gray in Patent 2,632,058, issued May 17, 1953. In effect, code words that are symmetrically disposed, or reflected, with respect to the central word in a columnar listing of code words have elements that are alike in all positions but one.

Hence, it is a further object of the invention to accomplish the framing of reflected binary code signals. A related object is to do so without resort to special framing signals.

To accomplish the foregoing and related objects the invention provides for selectively monitoring the occurrences of signals that provisionally constitute code words. When the monitored occurrences depart from an anticipated pattern, an out-of-frame condition is indicated and the code words are reconstituted until the actual and anticipated patterns are rendered substantially identical.

Specifically, for code signals of the reflected binary type representing information of random origin, e.g., ordinary speech, the signals associated with the second and third digits, or elements, of each code word respectively have higher and lower rates of occurrence than the signals associated with the other digits of the code word. Consequently, for signals provisionally grouped into code words, the occurrences of signals identified with the second and third digits of each code word can be monitored to detect a departure from the anticipated probabilites. In the event of a detected departure, the code signals are regrouped until synchronization is achieved.

For one embodiment of the invention, the occurrences are monitored by respective counters, the second of which is reset by the first as long as the code signals are in-frame. If the code signals are out of frame, the second counter reaches its terminal count before it can be reset. This produces a control signal which initiates regrouping of the code signals.

Other aspects of the invention will become apparent after the consideration of several illustrative embodiments taken in conjunction with the drawings in which.

Figures 1A, 1B, 2:
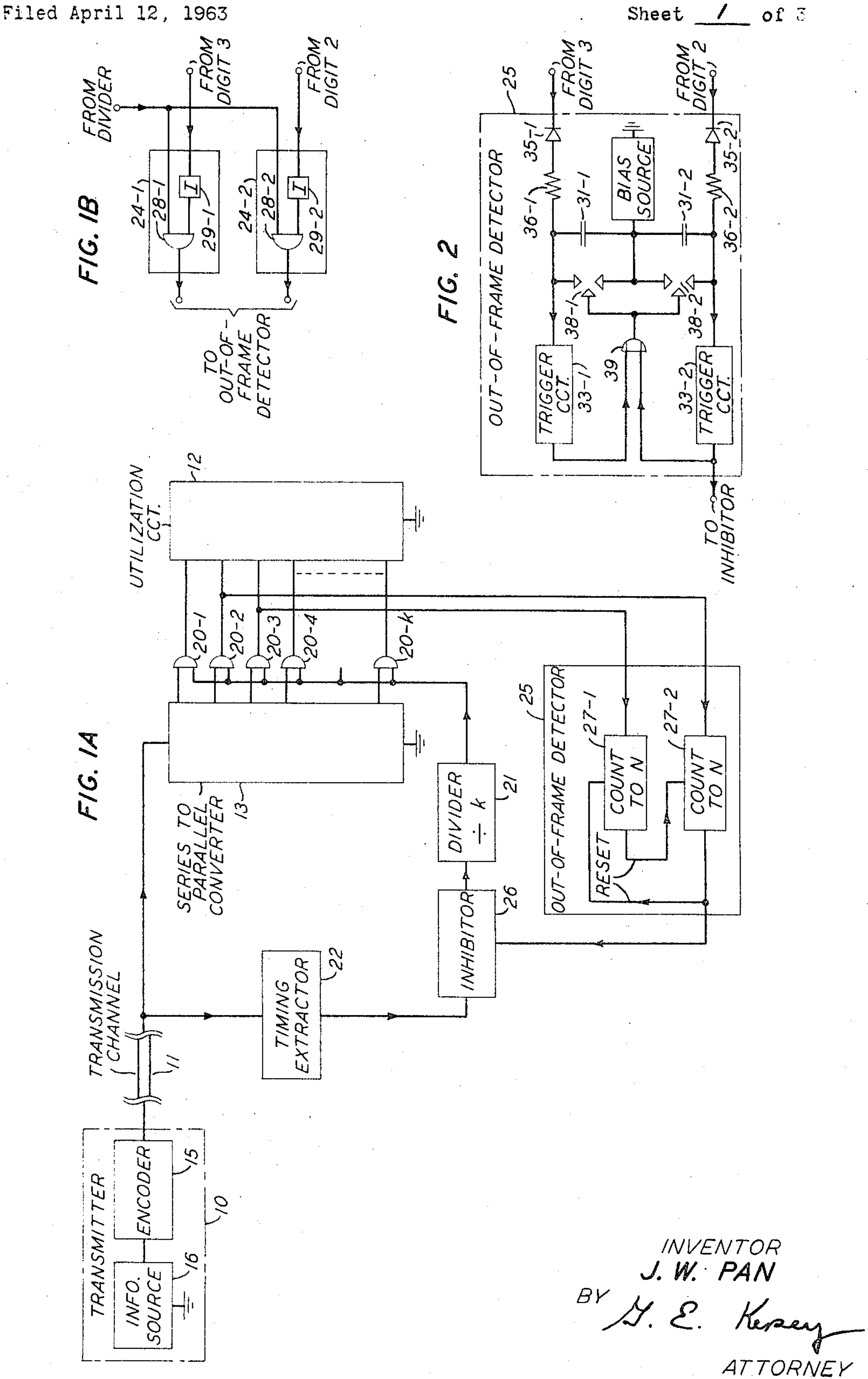
FIG. 1A is a block and schematic diagram of a synchronized reflected binary code system.
FIG. 1B is a block diagram of an adjunct for the system of FIG. 1A.
FIG. 2 is a block and schematic diagram of an alternative detector for the system of FIG. 1.

As shown for the system of FIG. 1, code signals from a transmitter 10 are dispatched along a transmission channel 11 and applied to a utilization circuit 12, after being appropriately grouped by a converter 13.

The performance of the converter is governed by the way in which the code signals are derived at the transmitter and also by any supplementary processing which takes place on the transmission channel. Since the latter merely represents an intermediate link of the system, it can include various processing components such as memory units for storing signals.

When an encoder 15 of the transmitter 10 derives serial code signals in reflected binary form from an information source 16, and the transmission channel is primarily a conduit to the utilization circuit, the converter advantageously groups the code signals by changing them from serial to parallel form. An appropriate converter 13 is a delay line appropriately terminated for no reflection or a conventional shift register. Individual taps connected to AND gates 20–1 through **20–*k*** are provided for the signals constituting a code group.

At the end of each code group interval, the AND gates 20 are enabled and, if there is synchronism between the converter 13 and the encoder 15, signals corresponding to a reflected binary code word enter the utilization circuit 12 which typically includes a decoder.

To operate the AND gates 20, an enablement signal appears at the output of a divider 21 at the end of an interval determined by counting the number $k$ of pulse positions in a code group. In order that the pulse positions will be clearly established, marker signals are generated by a timing extractor 22 which is, advantageously, a crystal tuned amplifier of conventional construction.

Although the operation of the divider 21 assures that the enablement signal for the AND gates 20 will occur at code group intervals, the code signals occupying the converter may represent portions of adjoining code words rather than a single code word as is the case for an in-frame condition.

Conventionally, the in-frame condition is achieved by means of a supplementary signal provided for that purpose. The invention, however, eliminates the need for any supplementary framing signal by its employment of an out-of-frame detector 25 which controls an inhibitor 26. The latter is included in a path extending from the timing extractor to the divider. Each time the inhibitor 26 is activated by the detector, a marker signal from the timing extractor is prevented from entering the divider. As a result, the enabling signal appearing at the output of the divider is delayed by the interval between marker signals, and the code signals in the converter 13 are regrouped by one digit position. Hence, when an out-of-frame condition occurs, detector 25 controllably regroups the code signals until synchronism is restored.

An illustrative out-of-frame detector applicable to a reflected binary code system is shown in FIG. 1A. It employs two counters 27–1 and 27–2 respectively connected to the second and third taps of the series-to-parallel converter. Both counters produce an output signal on attainment of the same preassigned count N, for example, thirty-two. The second counter 27–2 controls the inhibitor 26 and is reset by the first counter 27–1. As will be established for information of random origin, the signals associated with the second and third digits of each reflected binary code word respectively have higher and lower rates of occurrence than the signals associated with the other digits of the code word when the system is synchronized. Hence the counter 27–1, connected to the third tap of the converter, attains its preassigned count and resets the other counter 27–2 before the latter is able to apply a control signal to the inhibitor 26. On the other hand, when the code signals are out of frame, the situation is reversed, with the second counter 27–2 advancing at a faster rate than the first. Upon its attainment of its preassigned count, the second counter 27–2 operates the inhibitor and initiates the reframing action described earlier.

Another suitable out-of-frame detector for the system of FIG. 1 is illustrated in FIG. 2. In place of counters, the detector employs integrating capacitors 31–1 and 31–2 that are connected to individual trigger circuits 33–1 and 33–2. As before, the detector is connected to the converter terminals provisionally assigned to the third and second digits, respectively. As signals appear on these terminals, the capacitors 31–1 and 31–2 are incrementally charged through isolating diodes 35–1 and 35–2 and resistors 36–1 and 36–2 until one of the trigger circuits is activated. Each time this happens, the capacitors are discharged by normally open switches 38–1 and 38–2 that are operated through an OR gate 39. In addition, if the trigger circuit 33–2 connected to the second digit terminal is the one that is operated, a control signal is applied to the inhibitor in a manner described previously.

Figure 3A:
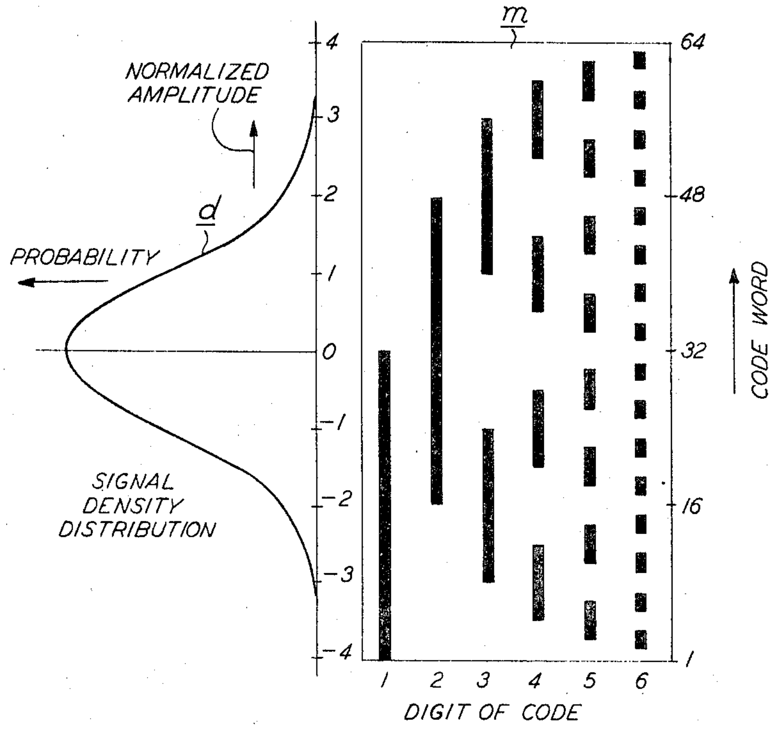
FIG. 3A is a pictorial representation of an illustrative reflected binary code mask accompanied by a density graph applicable to random signals.

For the purpose of illustrating the operation of the system of FIG. 1, the signals from the information source 16 have the signal density distribution *d* given in FIG. 3A. Such a distribution applies to signals of random origin, for example, voice and test tones of moderate amplitude.

To derive reflected binary code signals from the output of the source, the encoder 15 can employ a code mask *m* such as that shown with the signal density distribution of FIG. 3A. The "notches" in the mask produce digit signals, designated "1's," according to the code word level of the source signal. By inspection it is seen that, aside from that portion assigned to the first digit, the mask can be said to be reflected with respect to its center line identified with code word 32. In addition, because the signal density distribution *d* is peaked about the center line of the code mask *m*, code signals, e.g., "1's" corresponding to digit number 2, have the greatest probability of occurrence.

The probability of occurrence P for each of the various digits is determined from Equation 1.

$$P(d_n=1)=\frac{2}{\sqrt{\pi}}\int_0^A e^{-x^2}dx \qquad (1)$$

where P is the probability that the *n*th digit $d_n$ is a "1," and A is the relevant normalized amplitude of FIG. 3A.

Using Equation 1 discrete probabilities are obtained for the first six digits according to Table I.

TABLE I

| Digit | Probability of a "1" | Probability of a "0" |
|---|---|---|
| 1 | 0.500 | 0.5000 |
| 2 | 0.9545 | 0.0455 |
| 3 | 0.3147 | 0.6853 |
| 4 | 0.4951 | 0.5049 |
| 5 | 0.4996 | 0.5004 |
| 6 | 0.4999 | 0.5001 |

Figure 3B:
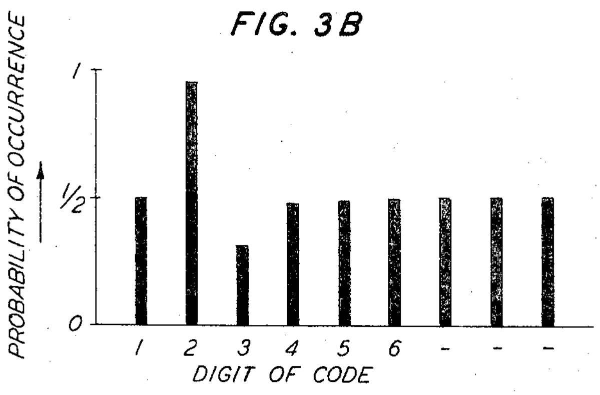
FIG. 3B is a graph of probability distributions applicable to random signals encoded using the mask of FIG. 3A.

The results of Table I are summarized in the probability distribution of FIG. 3B, from which it is seen that digits 2 and 3 respectively have a greater and a lesser probability of occurrence than the other digits. Consequently, an in-frame condition can be verified by monitoring the probabilities of occurrence on the second and third terminals of the converter 13 in FIG. 1. However, it is not apparent that the monitoring arrangement provides an indication of an out-of-frame condition.

Nevertheless, an analysis of the various states of an out-of-frame detector 25 employing two counters 27–1 and 27–2 demonstrates that an out-of-frame control signal will be produced rapidly for each possible out-of-frame condition.

Since each counter can count to N, the two counters provide the detector with $N\times N$ or $N^2$ possible combinations of counts or states. These states can be represented as in FIG. 4A by a square array whose upper left-hand term $a_{0,0}$ represents the state for which both counters have a count of zero. State $a_{0,0}$ will remain unchanged if the respective inputs to the first and second counters are "0's," i.e., if the inputs are 00.

Otherwise a transition takes place to state $a_{1,0}$, $a_{1,1}$ or $a_{0,1}$ depending upon whether the counter inputs are 10, 11, or 01. The general term $a_{i,j}$ of the array represents the state for which one counter has a count *i* and the other has a count *j*.

Starting with the upper left-hand state $a_{0,0}$, the first, or upper, counter 27–1 will produce an output signal that resets the second counter 27–2 when an end state, $a_{i,n}$, of the right-hand column is reached. Similarly, on attainment of an end state, $a_{N,j}$, in the bottom row, including the lower right-hand state $a_{N,N}$, the second, or lower, counter 27–2 produces a control signal that operates the inhibitor 26. Since the lower right-hand state obtains when both counters simultaneously reach the same ultimate count, it is necessary to slightly delay the reset of the second counter by the first to assure the generation of a control signal.

Figure 4A:
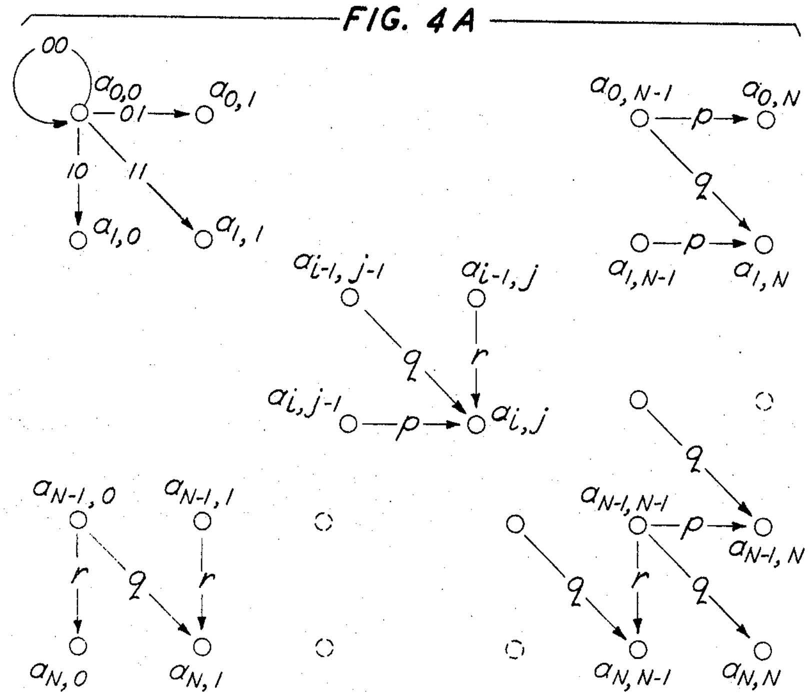
FIG. 4A is a state diagram for the system of FIG. 1.

For the array of FIG. 4A, the end states of the bottom row and right-hand column are reached in a finite time and, because the counters are irreversible, no state is recurrent. As a result, each transition can be completely described in terms of its conditional probabilities and the occasions of no actual transition can be ignored.

The conditional probabilities *p*, *q* and *r* of a transition to rightward, diagonal and downward neighboring states are given, respectively, in Equation 2, $$p=\frac{P(01)}{1-P(00)}$$

$$q=\frac{P(11)}{1-P(00)} \qquad (2)$$

and $$r=\frac{P(10)}{1-P(00)}$$

where P(XY), with X, Y taking on various values 0 and 1, is the probability of an X signal to the first, or upper, counter 27–1 and a Y signal to the second, or lower, counter 27–2.

Using the conditional probabilities of Equation 2, the probability $Q(i,j)$ of reaching state $a_{i,j}$ is written as a recurrence Formula 3:

$$Q(i,j)=pQ(i,j-1)+qQ(i-1,j-1)+rQ(i-1,j) \quad (3)$$
$$1 \leq i \leq N-1 \qquad 1 \leq j \leq N-1$$

which applies to all states in FIG. 4A except those along the border of the array.

For the border states, contained in the row and column including the initial state $a_{0,0}$, the probabilities Q are according to recurrence Formula 4:

$$Q(0,0)=1$$
$$Q(0,j)=pQ(0,j-1) \quad (4)$$
$$1 \leq j \leq N$$
$$Q(i,0)=rQ(i-1,0)$$
$$1 \leq i \leq N$$

Finally, for the end states, from which there can be no outward transmission, the probabilities $Q(N,j)$ for the bottom row, $Q(i,N)$ for rightmost column and $Q(N,N)$ for the lower right-hand state, are according to recurrence Formula 5:

$$Q(N,j)=qQ(N-1,j-1)+rQ(N-1,j)$$
$$1 \leq j \leq N-1$$
$$Q(i,N)=pQ(i,N-1)+qQ(i-1,N-1) \quad (5)$$
$$1 \leq i \leq N-1$$

and $$Q(N,N)=qQ(N-1,N-1)$$

Thus, on the basis of the recurrence Formulas 3 through 5, the probability L of reaching the end states of the right-hand column and generating a control signal is $$L=\sum_{i=0}^{N} Q(i,N) \quad (6a)$$

while the probability U of reaching the end states of the bottom row, except for the state $a_{N,N}$, and generating a reset signal for the lower counter 27–2 is $$U=\sum_{j=0}^{N-1} Q(N,j) \quad (6b)$$

To evaluate Equations 6*a* and 6*b* it is necessary to determine the transitional probabilities *p*, *q* and *r* of Equation 2. The latter are dependent upon the joint probabilities of adjacent code digits. Representative joint probabilities are set forth in Table II. They are obtained in conventional fashion and are applicable to the signal density distribution of FIG. 3A.

TABLE II

| Digits | Joint Probability P(XY) | | | |
|---|---|---|---|---|
| | P(00) | P(01) | P(10) | P(11) |
| 1–2 | .0227 | .4773 | .0227 | .4773 |
| 2–3 | .0026 | .0428 | .6826 | .2720 |
| 3–4 | .3834 | .3018 | .1212 | .1936 |
| 4–5 | .2534 | .2512 | .2468 | .2486 |
| 5–6 | .2500 | .2500 | .2500 | .2500 |

The transitional probabilities calculated from the data of Table II will depend upon whether "1's" or "0's" are used to advance the counters of FIG. 1.

Considering, initially, the in-frame condition for which the signals appearing on the second and third terminals of the converter 13 correspond to digits 2 and 3 of a code word, the transitional probabilities for "1's" are $p=0.0429$, $q=0.2727$ and $r=0.6844$. Those for "0's" are $p=0.0588$, $q=0.0036$ and $r=0.9376$. The resultant probabilities Q for the two cases of false out-of-frame pulse signals at the output of the detector are plotted against counter size N in FIG. 4B.

Figure 4B:
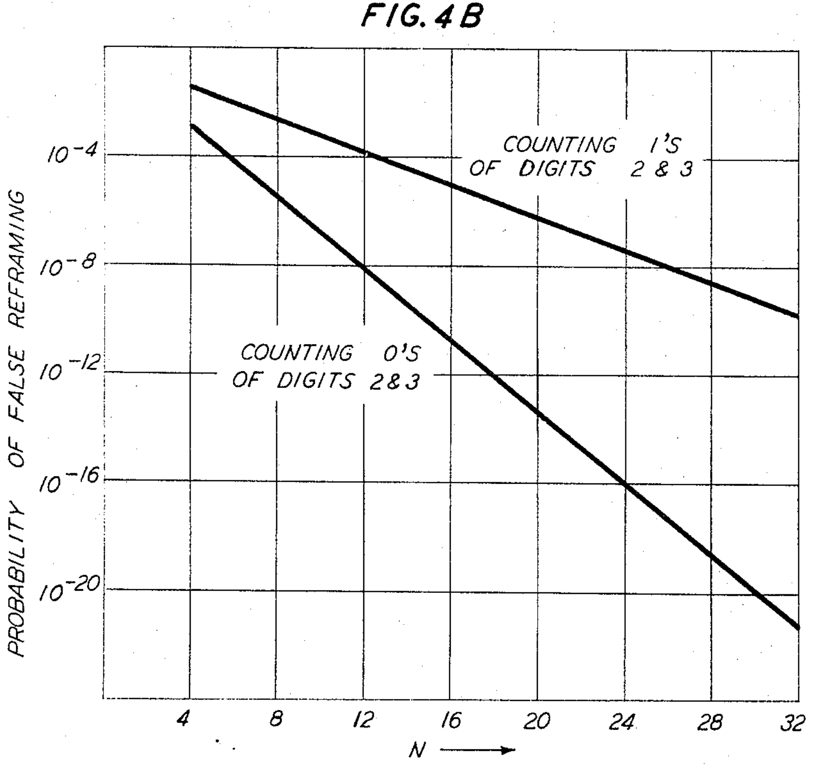
FIG. 4B is a performance graph for the system of FIG. 1.

It is seen from FIG. 4B that it is advantageous to advance the counters using "0's". Verification of this result is obtained by examining FIG. 3A. Considering only the positive region of the mask *m* because of its substantial symmetry, the upper (third digit) counter 27–1 advances when an information signal falls between normalized amplitudes of 0 and 1; the lower (second digit) counter advances for a signal between 2 and 3. If the signal falls between 3 and 4, the counters experience only an occasional advance when "0's" are counted. And a signal between 1 and 2 will not advance them at all. However, in the latter case when "1's" are counted, the counters advance often. On occasion a "1" is represented by the presence of a signal, and a "0" is represented by the absence of a signal. Under these circumstances the advance of the counters 27–1 and 27–2 is assured by connecting the second and third taps of the converter 13 in FIG. 1A to the out-of-frame detector 25 by way of the gates 24–1 and 24–2 of FIG. 1B.

Each gate 24–1 or 24–2 includes a subordinate AND gate 28–1 or 28–2 with two input terminals. One of the input terminals is attached to the divider 21. The other input terminal attaches to the appropriate tap of the converter 13 through a binary inverter 29–1 or 29–2. In operation the inverters convert "0's" into "1's" so that the simultaneous appearances of pulse signals, i.e., "1's" from the divider, cause the AND gates 28–1 and 28–2 to apply pulse signals to the counters 27–1 and 27–2.

In essence the two counters 27–1 and 27–2 determine the relative occurrences of normalized information signals ranging from 0 to 1 and from 2 to 3. Consequently, the system of FIG. 1 works well for information signals whose average signal density between normalized amplitudes ranging from +1 to −1 is higher than that between ±2 and ±3.

The probabilities Q of obtaining a control signal at the output of the detector for any condition, including all out-of-frame conditions, are summarized in Table III.

TABLE III

| Digits | Transition Probabilities | | | Probabilities of Out-of-Frame Pulse for— | |
|---|---|---|---|---|---|
| | *p* | *q* | *r* | N=16 | N=32 |
| 2–3 | .0588 | .0036 | .9376 | $2\times10^{-11}$ | $7\times10^{-22}$ |
| 3–4 | .3743 | .4754 | .1503 | .9371 | .9833 |
| 4–5 | .3343 | .3372 | .3284 | .5393 | .5356 |
| 5–6 | 1/3 | 1/3 | 1/3 | .5265 | .5182 |
| 6–7 | 1/3 | 1/3 | 1/3 | .5265 | .5182 |
| 7–8 | 1/3 | 1/3 | 1/3 | .5265 | .5182 |
| 8–9 | 1/3 | 1/3 | 1/3 | .5265 | .5182 |
| 9–1 | 1/3 | 1/3 | 1/3 | .5265 | .5182 |
| 1–2 | .9132 | .0434 | .0434 | .9999 | .9999 |

When an out-of-frame condition occurs, reframing cannot take place instantaneously. There is an average waiting period $W_N$, no greater than that indicated by Equation 7, before a control signal appears at the output of the detector 25.

$$W_N<\left(\frac{1}{L}-1\right)\frac{N}{FP_U}+\frac{N}{FP_L} \quad (7)$$

where:

N is the size of each counter
L is the probability that the upper counter 27–1 reaches a count of N
$P_U$ is the probability of a code signal at the lower counter 27–2
$P_L$ is the probability of a code signal at the lower counter 27–1, and
F is the rate at which the AND gates 20 are enabled.

The first term of Equation 7 represents the average operating time during which the lower counter 27–2 is reset by the upper counter 27–1. It is based upon the fact that an out-of-frame control signal is emitted for every $1/L$ starts, and, of these, the upper counter will reach its terminal count $$\left(\frac{1}{L}-1\right) \text{times}$$

Aside from the resetting action of the upper counter, there is also an average operating time before the lower counter can produce a control signal. This is given by the second term of Equation 7. Since an out-of-frame condition implies a higher probability a posteriori than a priori of input signals to the lower counter, the waiting time is less than the sum of terms in Equation 7.

When applied to a system that is already synchronized, Equation 7 gives the average time between false reframings. For example, in a code system according to the invention where reflected binary code words of 9 digits are produced at a bit (binary digit) rate of 108 megacycles, the average time between false reframings is about 29 hours for a counter with $N=16$ and well over a century for a counter with $N=32$.

In the system of FIG. 1, reframing is accomplished by shifting one digit position for every out-of-frame control signal and the average reframing time $R_N$ of Equation 8 is the sum of the average waiting times $W_N$ for adjacent pairs of digits.

$$R_N=\sum_{i\neq 2}\left[\left(\frac{1}{L_{i,i+1}}-1\right)\frac{N}{FP_{i+1}}+\frac{N}{FP_i}\right]$$
$$=\frac{N}{F}\sum_{i\neq 2}\left[\left(\frac{1}{L_{i,i+1}}-1\right)\frac{1}{P_{i+1}}+\frac{1}{P_i}\right] \quad (8)$$

where $i$ is the digit number,
$L_{i,i+1}$ is the probability of out-of-frame control signal for the digit pairs $i,i+1$, and
$P_i$ is the probability of a "0" for digit $i$.

For the example considered earlier, the average reframing times $R_N$ of counters with terminal counts N of 16 and 32 are, respectively, 37 and 76 microseconds.

Numerous other adaptations of the invention to the synchronization of code systems in general will occur to those skilled in the art.

What is claimed is:

1. Apparatus for synchronizing a code system having a known relative rate of code signal occurrence for selected digit positions which comprises:
   means for grouping the code signals,
   means for individually monitoring the occurrence of signals in each of said selected digit positions in each group,
   means for periodically comparing the monitored occurrences of said signals in said selected digit positions to detect departures from said known relative rate of occurrence, and
   means responsive to said comparing means for regrouping said code signals upon the detection of said departures.

2. Apparatus for synchronizing a code system which comprises:
   means for registering successive groups of code signals in provisional code signal positions,
   means for monitoring the occurrences of signals in one of said code signal positions,
   means for monitoring the occurrences of signals in another of said code signal positions,
   means for comparing the monitored occurrences of signals in one of said positions with those of signals in the other of said positions to detect departures from an anticipated relative rate occurrence, and
   means responsive to said comparing means for altering the registration of said code signals.

3. Apparatus for processing reflected binary code signals which comprises:
   means for grouping the code signals and provisionally assigning individual digit positions thereto,
   means for indicating the occurrence rate of signals assigned to the second digit position,
   means for indicating the occurrence rate of signals assigned to the third digit position, and
   means for comparing the indicated occurrence rates.

4. Apparatus as defined in claim 3 further including means responsive to said comparing means for regrouping said code signals.

5. Apparatus for framing reflected binary code signals which comprises:
   a shift register to which incoming code signals are applied,
   a plurality of terminals,
   means responsive to the incoming signals for gating a group of the registered signals to said terminals,
   means connected to two of said terminals for monitoring the relative rates of occurrence of gated signals appearing thereon, and
   means connected to said monitoring means for controlling the gating of said gating means.

6. Apparatus for framing reflected binary code signals which comprises:
   an input point to which the signals are applied,
   means, connected to said input point and having a plurality of output terminals, for registering successive groups of said signals,
   means included in said terminals and enabled from said input for gating the constituent signals of each registered group to said terminals,
   means, connected to selected ones of said terminals, for comparing the rates of occurrence of signals appearing thereon, and
   means, responsive to said comparing means, for selectively altering the groupings of the registered signals.

7. Apparatus for framing code signals which comprises:
   means for provisionally combining the code signals into code words whose constituents have anticipated probabilities of occurrence,
   means for individually monitoring the rates of occurrence of selected ones of the provisionally combined signals,
   means for detecting a joint departure of the monitored rates from those anticipated, and
   means for altering the combinations of said signals for a detected departure of the anticipated rates from those monitored.

References Cited

UNITED STATES PATENTS

| | | | |
|---|---|---|---|
| 3,056,109 | 9/1962 | Loposer | 340—146.1 |
| 3,127,475 | 3/1964 | Coulter | 179—15 |
| 3,159,811 | 12/1964 | James et al. | 340—146.1 |
| 3,159,812 | 12/1964 | Engel | 340—146.1 |
| 3,175,157 | 3/1965 | Mayo et al. | 179—15 |
| 3,188,569 | 6/1965 | Mahony | 179—15 |
| 3,291,972 | 12/1966 | Helm | 235—152 |

ROBERT L. GRIFFIN, *Primary Examiner.*

R. L. RICHARDSON, *Assistant Examiner.*

U.S. Cl. X.R.

328—72; 340—146.1